(12) United States Patent
Fasano

(10) Patent No.: US 9,799,477 B2
(45) Date of Patent: Oct. 24, 2017

(54) CIRCUIT BREAKER WITH CURRENT LIMITING AND HIGH SPEED FAULT CAPABILITY

(71) Applicant: Michael Fasano, Watertown, CT (US)

(72) Inventor: Michael Fasano, Watertown, CT (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 15/192,122

(22) Filed: Jun. 24, 2016

(65) Prior Publication Data

US 2016/0379789 A1 Dec. 29, 2016

Related U.S. Application Data

(60) Provisional application No. 62/184,512, filed on Jun. 25, 2015.

(51) Int. Cl.
*H01H 71/40* (2006.01)
*H02H 3/093* (2006.01)
*H01H 71/10* (2006.01)

(52) U.S. Cl.
CPC ........ *H01H 71/40* (2013.01); *H01H 71/1009* (2013.01); *H02H 3/093* (2013.01)

(58) Field of Classification Search
CPC .. H01H 71/40; H01H 71/1009; H02H 1/0007; H02H 3/025; H02H 3/093
See application file for complete search history.

(56) References Cited

U.S. PATENT DOCUMENTS

| 3,395,372 | A | | 7/1968 | Opad | |
|---|---|---|---|---|---|
| 3,636,410 | A | * | 1/1972 | Pardini | H01H 71/44 335/35 |
| 4,180,788 | A | * | 12/1979 | Barkan | H01H 33/666 335/190 |
| 4,292,612 | A | * | 9/1981 | Howell | H01H 89/08 335/14 |
| 4,321,440 | A | * | 3/1982 | Fujiwara | H01H 71/503 200/324 |
| 6,222,433 | B1 | * | 4/2001 | Ramakrishnan | H01H 1/2058 200/308 |
| 6,671,150 | B2 | | 12/2003 | Elms et al. | |
| 8,749,329 | B2 | | 6/2014 | Fasano | |
| 8,803,640 | B2 | | 8/2014 | Fasano | |

FOREIGN PATENT DOCUMENTS

CN 101866790 A 10/2010

* cited by examiner

*Primary Examiner* — Bernard Rojas
(74) *Attorney, Agent, or Firm* — St. Onge Steward Johnston & Reens, LLC

(57) ABSTRACT

A circuit breaker arraignment includes at least two trip mechanisms. The first trip mechanism acts to immediately trip to open contacts of the circuit breaker upon reaching a first threshold current level, and the second trip mechanism acts to trip to open the contacts once both a second current threshold is reached and a time delay has elapsed. The contacts are moved by a linkage assembly that is held under mechanical advantage such that when acted on by one of the two trip mechanisms, the mechanical advantage is released to rapidly open the contacts.

17 Claims, 4 Drawing Sheets

CIRCUIT BREAKER WITH CURRENT LIMITING AND HIGH SPEED FAULT CAPABILITY

FIELD OF THE INVENTION

The present invention relates generally to the protection of electrical devices, and more specifically, relates to a circuit breaker having a first high speed solenoid for interrupting a circuit at higher current faults and a second solenoid for interrupting a circuit at lower current faults.

BACKGROUND OF THE INVENTION

A circuit interrupter is an electrical component that can break an electrical circuit, interrupting the current. A basic example of a circuit interrupter is a switch, which generally consists of two electrical contacts in one of two states; either closed meaning the contacts are physically touching and electrical current pass from one contact to the other, or open, meaning the contacts are separated relative to each other thereby preventing the flow of electrical current there between. A switch may be directly manipulated by a person as a control signal to a system, such as a computer keyboard button, or to control power flow in a circuit, such as a light switch.

A circuit breaker can be used as a replacement for a fuse. Unlike a fuse, which operates once and then has to be replaced, a circuit breaker can be reset (either manually or automatically) to resume normal operation. Fuses perform much the same function as circuit breakers, however, circuit breakers are typically safer to use and may be reset after tripping. If a fuse blows, a person will often have to closely examine the fuses to determine which fuse in particular was burned or spent. The fuse will then have to be removed from the fuse box, discarded and a new fuse will have to be installed.

Circuit breakers are much easier to operate than fuses. When a circuit breaker trips, one can easily look at the electrical panel and see which breaker handle has moved to the tripped position. The circuit breaker can then be "reset" by turning the handle to the "off" position, and then moved to the "on" position. In general, a circuit breaker has two contacts located inside of a housing. The first contact is typically stationary, and may be connected to either the "line" side connection (connection to the power supply) or the "load" side connection (connection to the device to be powered). The second contact is movable with respect to the first contact, such that when the circuit breaker is in the "off", or tripped position, a physical gap exists between the first and second contacts.

To trip the circuit breaker so as to "open" the circuit, a solenoid with an overcurrent sensor may be used. When the overcurrent sensor senses a specific current level, or a percentage above the rated current of the circuit breaker, the solenoid may be actuated to mechanically move an arm thereby tripping the circuit breaker to open the circuit.

To prevent the circuit breaker from accidentally tripping, the tripping mechanism can be set to a relatively high level, so that a small current spike would not result in the tripping of the circuit breaker. However, this configuration is disadvantageous in that in the event of a relatively small over current for an extended period of time, the circuit breaker would not trip. This is undesirable as it could lead to damage of the electrical distribution system itself and to equipment connected to the distribution system.

Instead of setting the tripping mechanism at a high current level, many circuit breakers have a delayed tripping mechanism so that the circuit breaker only trips after the detection of an over current condition for a specific period of time. This prevents the circuit breaker from immediately tripping, thus preventing many situations where the circuit breaker would be accidentally tripped upon the detection of a relatively low current spike (e.g., startup of a motor), but would also protect the equipment from a low over current condition that lasts for an extended period of time (e.g., the motor windings become damaged and are beginning to short). However, the introduction of the delay prevents the circuit breaker from immediately tripping when a dangerous high current spike or short, occurs, which can severely damage both the electrical distribution system itself and the connected equipment. For example, in situation where a ground fault occurs, a person may accidentally come into contact with electrical current, which any delay in the tripping of the circuit breaker corresponds to an increase in the amount of time the person is in contact with the live electrical circuit leading to severe injury, or even death. Likewise, during a short circuit condition, if the circuit breaker is delayed before tripping, the equipment connected to the electrical circuit may be severely damaged. However, current limiting circuit breakers with a built-in time delay generally do not trip until after the angle $\theta$ of the sine wave reaches zero. Accordingly, in one situation where a large current spike occurs just after the zero crossing, the delay in the breaker tripping can approach the time it takes for the sine wave to cycle 180°, which is unacceptable. The removal of even a few milliseconds from this delay can be crucial to avoid severe personal injury or permanently damaging connected equipment.

However, the concept of inverse time tripping in and of itself is well known. Inverse time tripping is a characteristic of circuit breakers where the breaker trips more slowly with lower overcurrent, and more quickly I with higher overcurrent. As an example, Article 100 of the National Electric Code (NEC) states: "Inverse Time (as applied to circuit breakers). A qualifying term indicating that there is purposely introduced a delay in the tripping action of the circuit breaker, which delay decreases as the magnitude of the current increases."

The inverse time is typically achieved by attaching some mechanical accessories in the circuit breaker. In one example, it is achieved in an induction disc relay by positioning a permanent magnet such that, when the disc rotates, it cuts the flux of a permanent magnet. A current is then induced in the disc, which slows down the movement of the disc. A circuit breaker can be made an inverse time breaker, by providing a piston and an oil dash-pot. A piston that is attached to the moving iron plunger, is immersed in the oil in a dash-pot. When the solenoid relay is actuated, the piston moves upwards along with iron plunger wherein the viscosity of the oil slows the upward movement of plunger. The speed of this upward movement against gravity depends upon how strongly the solenoid attracts the iron plunger. The attraction force is determined based on the magnitude of actuating current. This results in a time of operation of the breaker that is inversely proportional to the actuating current.

However, this configuration has the disadvantage of being bulky, requiring many complex components including an oil dash-pot, which may be subject to leaking. The complex and numerous parts and required maintenance result in a relatively expensive device that is not appropriate for many installations.

Also known are thermal magnetic circuit breakers that utilize techniques where electromagnet components respond quickly to large surges in current and a bi-metallic strip responds more slowly to lower over-currents situations. The thermal portion of the circuit breaker provides an "inverse time" response feature, which trips the circuit breaker more quickly for a larger overcurrent situation, but allows a smaller overcurrent to persist for a longer time before opening.

A major disadvantage of the bi-metallic strip is that the rate of heating and cooling of the bi-metal is affected by ambient temperature, the performance of the breaker differs for different ambient temperatures. While this major drawback can be addressed somewhat by use of a resistance temperature detector (RTD), this again leads to a complex device having numerous parts and requires a controller to control the RTD leading to a relatively expensive device and is simply not appropriate for many installations.

Also known in the prior art is U.S. Pat. No. 8,749,329 entitled "Magnetic Circuit Interrupter With Current Limiting Capability" to Michael Fasano. This reference discloses two separate trip mechanisms each comprising a solenoid that are designed to actuate at different current levels. A major benefit that this system provides for is that it allows for quick tripping for a relatively large current spike but would not trip for a relatively small current spike. Additionally, the functioning of the system is not dependent on ambient temperature.

However, a limitation of the above-listed references relates to the speed at which the system can react to overcurrent conditions. For example, it is understood that very small amounts of time (milliseconds) can make the difference in whether a device connected to the system in an overcurrent condition is damaged and/or destroyed or whether the device is safely disconnected without damage.

SUMMARY OF THE INVENTION

What is desired, therefore, is a circuit breaker that allows for very fast tripping for a relatively large current spike but would not trip for a relatively small current spike.

It is further desired to provide a circuit breaker that can very quickly open an electrical circuit with a high current surge but would not open for a small current spike the functioning that does not comprise an overly complicated design, needs frequent maintenance, and is compact in size and relatively low cost.

It is still further desired to provide a mechanism that assist the contacts to open more quickly than conventional contacts to as to avoid damage to any devices connected to the circuit in the event of a short or fault condition.

The above is achieved by the provision of a circuit breaker having a solenoid that includes a delay for interrupting a circuit at lower current faults and further includes another high-speed solenoid for interrupting the electrical circuit at higher current faults. This is advantageous because in the event of large current spikes there is minimal delay before the circuit breaker trips, however, the system avoid nuisance trips due to relatively low over current situations.

In particular, a linkage which acts as a spring mechanism, provides a mechanical advantage to assist the high speed solenoid to open the contacts in a very short period of time. The linkage, may comprise multiple pivot arms including, for example, a first pivot arm, a second pivot arm connected to the first pivot arm, and a third pivot arm connected to the second pivot arm. It will be understood that the first pivot arm may be connected to a handle and the third pivot arm may be connected to a moveable contact.

In the above-described linkage configuration, the linkage includes a mechanical advantage such that, when the contacts are in a closed position, an angle $\theta_1$ is formed between the first pivot arm and the second pivot arm, where the angle $\theta_1$ is less than 180 degrees. Additionally, when the contacts are in the open position, an angle $\theta_3$ is formed between the first pivot arm and the second pivot arm, wherein the angle $\theta_3$ is greater than 180 degrees. The mechanical advantage (spring mechanism) functions to open the contacts much more quickly than conventional switches because the linkage functions to mechanically snap the contacts open.

In still another embodiment, the second pivot arm comprises a first latch and a second latch such that the second pivot arm can lock.

In another embodiment, the solenoid and/or the high speed solenoid comprises an overcurrent sensor for measuring an electrical current passing through the circuit breaker. It is contemplated that the solenoid may comprise a hydraulic magnetic solenoid or a thermal magnetic solenoid. Likewise, it is contemplated that the high speed solenoid may also comprise a hydraulic magnetic solenoid or a thermal magnetic solenoid.

In still another embodiment, the high speed solenoid may be set to immediately trip when a measured electrical current is at least 600% of a maximum rated current of the circuit breaker.

In yet another embodiment, the solenoid may be set to trip on a time delay when a measured electrical current is at least 125% of a maximum rated current of the circuit breaker.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one advantageous embodiment of the invention a circuit breaker is provided comprising a first contact and a second contact where the first or said second contact movable with respect to the other contact such that contacts may be placed in a first state in where the contacts are closed relative to each other, and a second state where the contacts are open relative to each other. The circuit breaker further comprises an overcurrent mechanism for measuring a current passing through the contacts, the overcurrent mechanism including, a first trip mechanism for causing the contacts to open relative to each other, the first trip mechanism opening of the contacts when the current exceeds a first threshold level, a second trip mechanism for causing the contacts to open relative to each other, the second trip mechanism having a setting that introduces a time delay in the opening of the contacts when the current exceeds a second threshold level, and a linkage having at least first and second pivot arms connected to each other via a pivot, the linkage acted on by said first trip mechanism or the second trip mechanism such that actuation of said first trip mechanism or the second trip mechanism causes movement of the linkage, which causes one of the first or second contacts to move relative to the other contact. The circuit breaker still further comprises a handle connected to the linkage such that manual actuation of the handle causes the contacts to move between open and closed positions. The circuit breaker is provided such that when the contacts are in a closed position, an angle $\theta_1$ is formed between the first pivot arm and the second pivot arm, where the angle $\theta_1$ is less than 180 degrees, the first and second pivot arms held under a mechanical advantage. The circuit breaker is further provided such that when the linkage is acted on by the first trip mechanism or the second trip mechanism the mechanical advantage is released and one of the contacts are moved to the open position such that the angle $\theta_1$ is changed to an angle $\theta_3$, wherein the angle $\theta_3$ is greater than 180 degrees.

In another advantageous embodiment of the invention a circuit breaker is provided comprising a first and a second contact, the second contact movable with respect to the first contact such that contacts may be placed in a first state in where the contacts are closed relative to each other, and a second state where the contacts are open relative to each other. The circuit breaker further comprises a first trip mechanism measuring a current passing through the contacts and causing the second contact to open relative to the first contact when a current measured current exceeds a first threshold level, and a second trip mechanism measuring a current passing through the contacts and causing the second contact to open relative to the first contact when a current measured current exceeds a second threshold level said second trip mechanism having a setting that introduces a time delay such that the second contact does not move until after the time delay expires. The circuit breaker still further comprises a linkage having a first pivot arm connected to a second pivot arm, and the second pivot arm connected to a third pivot arm, the third pivot arm connected to the second contact, the linkage acted on by the first trip mechanism or the second trip mechanism such that actuation of the first trip mechanism or the second trip mechanism causes movement of the linkage, which causes the second contact to move relative to the first contact. The circuit breaker further comprises a handle connected to the first pivot arm such that manual actuation of the handle causes the second contact to move between open and closed positions. The circuit breaker is provided such that when the contacts are in a closed position, an angle $\theta_1$ is formed between the first pivot arm and the second pivot arm, where the angle $\theta_1$ is less than 180 degrees, the first and second pivot arms held under a mechanical advantage. Additionally, the circuit breaker is provided such that when the linkage is acted on by said first trip mechanism or the second trip mechanism the mechanical advantage is released and the second contact is moved to the open position such that the angle $\theta_1$ is changed to an angle $\theta_3$, wherein the angle $\theta_3$ is greater than 180 degrees.

Other objects of the invention and its particular features and advantages will become more apparent from consideration of the following drawings and accompanying detailed description.

DETAILED DESCRIPTION OF THE INVENTION

Figure 1:
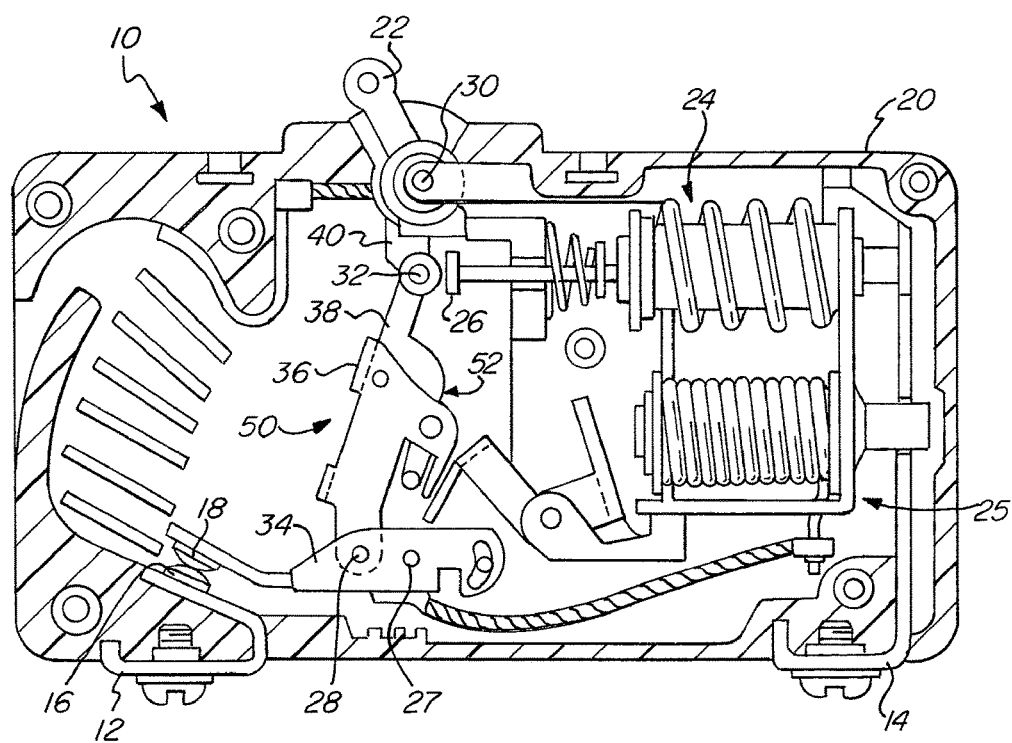
FIG. 1. is a side view of a circuit breaker in a non-tripped position according to the present invention.

The exemplary embodiments of the present invention may be further understood with reference to the following description and the related appended drawings, wherein like elements are provided with the same reference numerals.

The exemplary embodiments of the present invention are related to a device capable of opening an electrical circuit very rapidly in the event of a fault or overcurrent condition. Specifically, the device uses a multiple solenoids to open the contacts in a circuit breaker, each solenoid functioning differently such that the circuit breaker is adapted to properly function under multiple different conditions. The exemplary embodiments are described with reference to a circuit breaker, but those skilled in the art will understand that the present invention may be implemented on any electrical device that has electrical contacts that can be opened and closed.

As best seen in FIG. 1 (FIG. 1), a circuit breaker 10 according to one embodiment of the present invention is shown in the closed position. The circuit breaker 10 can be used in any commercial or non-commercial application, and may be designed to replace current circuit breakers without the need to modify existing equipment. The circuit breaker 10 is designed to trip/open based on different circuit conditions and is therefore better adapted to protect a circuit and equipment connected thereto than current circuit breakers.

Electrical currents flows into the circuit breaker 10 through a first terminal 12. The first terminal 12, which may be referred to as the line side (connected to the source of electrical power), and is electrically connected to a first contact 16. The first contact 16 remains stationary and may be attached to the housing 20 of the circuit breaker 10. A second terminal 14, may be electrically connected to a load that receives the electrical power passing through the circuit breaker 10.

In a closed position, a second contact 18 is electrically connected to the first contact 12. In this example, the second contact 18 is movable relative to first contact 16, however, one of skill in the art would understand that either the first contact 12 or the second contact 18 or both could be moveable with respect to the other. During normal operation, when the contacts 12, 18 are in the closed position, the first contact 16 and the second contact 18 physically contact each other to create a closed circuit between the line (power) and the load (equipment receiving the power) so that electrical current moves between the terminals 12, 14. If there is an overcurrent condition (i.e., a short in the circuit), the circuit breaker 10 is designed to automatically trip, causing the second contact 18 to separate from the first contact 16 thereby opening the electrical circuit.

In the event that the circuit breaker is equipped with Ground Fault Circuit Interrupt (GFCI) circuitry, in the event that some of the electrical current from the line moves through a ground connection (i.e., a ground fault), the circuit breaker 10 is again, designed to automatically trip as described above.

When the circuit breaker 10 is in a closed position, the second contact 18 is physically in contact with the first contact 16 by a third pivot arm 34. In the event of an overcurrent condition (or ground fault condition with a GFCI), the third pivot arm 34 rotates around a pivot point created by a pivot pin 27, thereby placing the circuit in the open state. In the open state, the first contact 16 and second contact 18 no longer physically touch each other interrupting the flow of electrical current there between.

The circuit breaker 10 can be placed into an open state via a linkage 50 actuated either manually using a handle 22 or due to an overcurrent or fault via either the first tripping mechanism 24 or the second tripping mechanism 25. The main components of the linkage 50 are a first pivot arm 40, a second pivot arm 52 and a third pivot arm 34. In this particular embodiment, the second pivot arm 52 comprises a first latch 36 and a second latch 38, although one of skill in the art would recognize that the second pivot arm 52 could be provided as a single piece.

Figure 2:
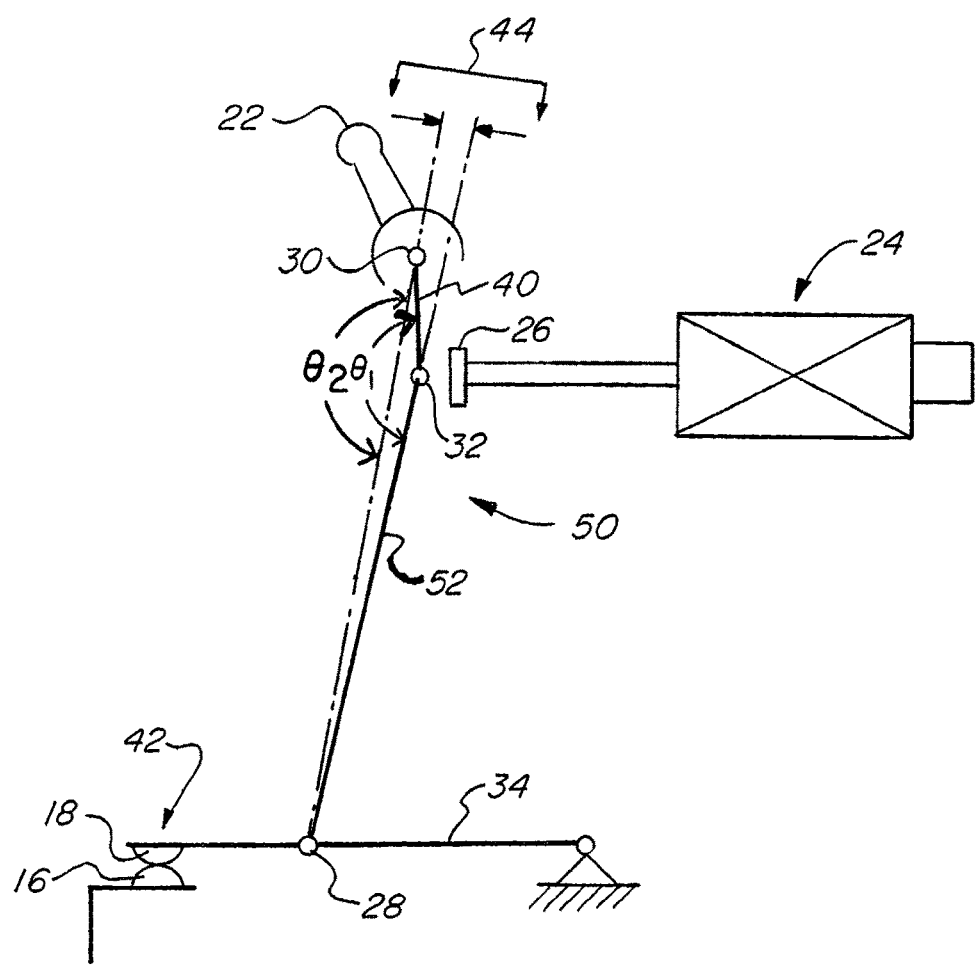
FIG. 2 is an illustration of the high speed trip mechanism and hammer of FIG. 1 in a non-tripped position.

Turning now to FIG. 2 (FIG. 2), the first and second pivot arms 40, 52 are advantageously arranged in order to utilize mechanical advantage in holding the third pivot arm 34 down. The first pivot arm 40 and second pivot arm 52 are connected via a center pin 32, which when the breaker 10 is in the closed position forms an angle $\theta_1$ that is less than 180°. The second pivot 52 arm is connected to the third pivot arm 34 via a bottom pin 28 at a location between the pivot pin 27 and the second contact 18. In order to open the contacts 16, 18 the center pin 32 must be moved from right to left during which the first pivot arm 40 and second pivot arm 52 will align where $\theta_2$ is approximately 180°. During the transition from $\theta_1$ to $\theta_2$ the second pivot arm 52 imparts a force on the third pivot arm 34 at the bottom pin 28. When the center pin 32 transitions from $\theta_2$ to $\theta_3$, which is less than 180°, the force on pivot arm 34 helps to "spring" the contacts 16, 18 open. This operation will be further explained below in connection with the first tripping mechanism 24.

In order to put the circuit breaker 10 in the open state manually, a handle 22 is connected to the first pivot arm 40. The first pivot arm 40 rotates around a pivot point created by a top pin 30. During rotation of the handle 22 the first pivot arm 40 and the second pivot arm 52 push down on the third pivot arm 34. This will actuate the linkage 50 when the first and second pivot arms 40, 52 pass through 82, the force imparted on the system will cause the pivot arm 34 to rotate and very rapidly unlock from the circuit breakers closed position. In turn, the motion of pivot arm 34 will cause second contact 18 to very rapidly separate from the first contact 16 and thus the circuit breaker is placed in a tripped or open state.

When the circuit breaker 10 is in a closed position as shown, electrical current passes through the first terminal 12, through the first contact 16 and through to the second contact 18. The second contact 18 is mechanically connected to a first trip mechanism 24. The first trip mechanism 24 may generally be any type of solenoid that is capable of actuating a hammer 26 rapidly into the center pin 32, and may more specifically be a hydraulic magnetic solenoid or thermal magnetic solenoid. The first trip mechanism 24 may also have an overcurrent sensor. When the overcurrent sensor detects a certain current, the overcurrent sensor may activate the solenoid, which actives the hammer 26. The hammer 26 may also be considered to be a plunger, arm or any similar extruding object that suffices to actuate the center pin 32.

Similarly, in order to return the circuit breaker 10 to a closed state, such that the first contact 16 and the second contact 18 physically contact each other, a force must be applied to the handle 22 such that the linkage 50 passes through an angle of approximately 180 degrees. However, the direction of bias must be opposite to the bias when opening the circuit. In both cases, either opening or closing the circuit breaker 10, a mechanical advantage is created by the linkage 50 acting like a spring. The mechanical advantage generated by the linkage 50 causes the contacts 16, 18 to be firmly held in place and also allows the contacts 16, 18 to quickly snap open as it passes from $\theta_2$ to $\theta_3$.

In a preferred embodiment, the first trip mechanism 24 would immediately trip the circuit breaker 10 upon a detection of a current of about 600% of the maximum rated current of the circuit breaker 10. Any spike corresponding to about 600% or more is generally accepted to be a current level which does not normally occur, and may be indicative of a specific problem. Upon the detection of a current spike of about 600%, it is preferable to trip a circuit breaker as quickly as possible to prevent damage to the distribution system itself and to any equipment connected to the circuit breaker 10, or to prevent harm to a person that may have come in contact with the load side electrical current. In a preferred embodiment, the circuit breaker 10 is tripped immediately via the first trip mechanism 24 upon a detection of a current of about 600% of the maximum rated current and upon the detection of smaller over currents (or current spikes) via a second delayed trip mechanism 25.

In the event of an overcurrent condition, fault or other large current spike above a specified threshold, the first trip mechanism 24 with hammer 26 is activated. With little or no delay, the hammer 26 extends very rapidly from the first trip mechanism 24 as a high-speed ramming mechanism that will contact the pivot point at the center pin 32. The hammer contacting the center pin 32 at relatively high speed will impart a force on the linkage 50 and in turn the linkage 50 imparts a spring-like force on the third pivot arm 34. The force on the third pivot arm 34 is highest at $\theta_2$ As the hammer continues to actuate the spring mechanism spring from $\theta_2$ to $\theta_3$ the force on pivot arm 34 has a spring effect causing the linkage 50 to open more rapidly and thereby separating first contact 16 and second contact 18 more quickly and efficiently.

In the embodiment shown in FIG. 1, the first trip mechanism 24 may be electrically connected to a second trip mechanism 25. The second trip mechanism 25 may also generally consist of an overcurrent sensor and any solenoid that is capable of actuating the linkage 50, and may more specifically be a hydraulic magnetic solenoid or thermal magnetic solenoid. Preferably the second trip mechanism 25 trips the circuit breaker 10 upon detection of current levels of 125-600% of the maximum rated current. The second trip mechanism 25 may also be set to trip the circuit breaker 10 after a specified delay in the event of a sustained "low" over current condition above a particular threshold. Both the first trip mechanism 24 and the second trip mechanism 25 are preferably designed to trip at different load levels and/or after the load level exceeds different thresholds of time. For example, in certain embodiments, the first trip mechanism 24 is designed to immediately trip at 600% of the maximum rated current and the second trip mechanism 25 is designed to trip after a time delay where the current remains at 125% of the maximum rated current or more.

As best seen in FIG. 2, an illustration (side view) of the functioning of the first trip mechanism 24 and the hammer 26 of the circuit breaker 10 is shown in a closed or non-tripped state 42 where $\theta_1$ is less than 180°. The first trip mechanism 24 is in an un-activated state and the first and second contacts 16, 18 are touching. The pivot points located at the bottom pin 28, the top pin 30, and the center pin 32 combine to form the linkage 50. The linkage 50 facilitates a rapid separation of the first and second contacts 16, 18 in the event of an overcurrent or fault.

Figure 3:
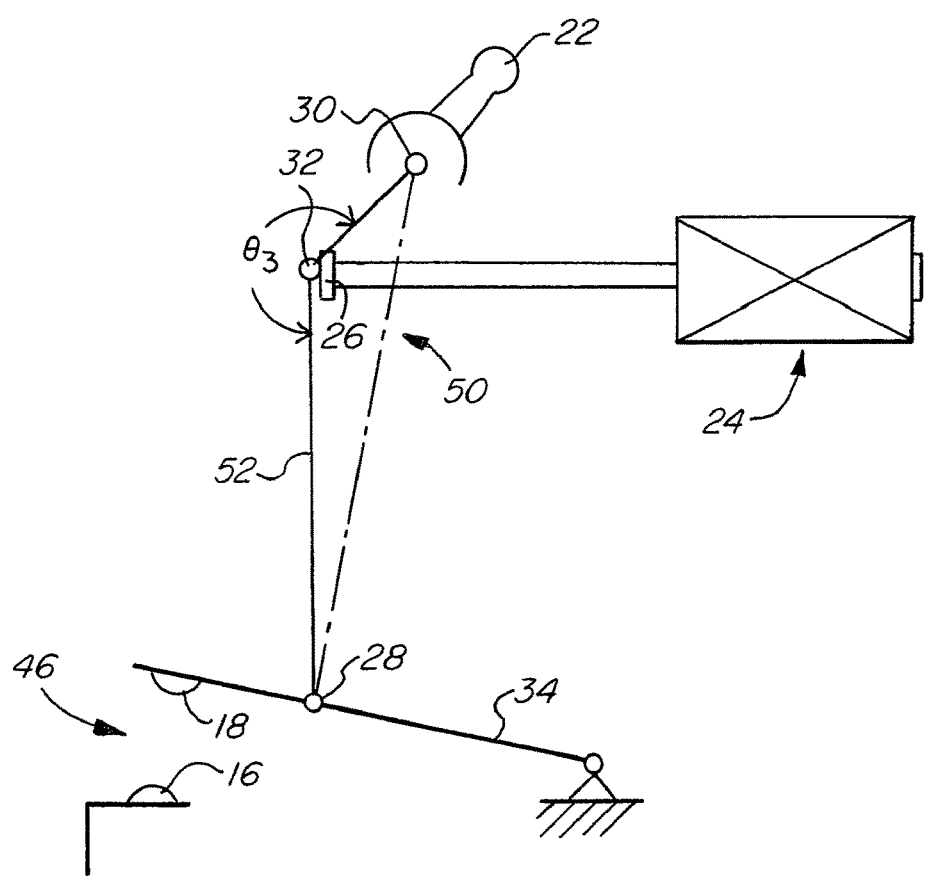
FIG. 3 is an illustration of the high speed trip mechanism and hammer of FIG. 1 in a tripped position.

As best seen in FIG. 3 (FIG. 3), an illustration (side view) of the functioning of the first trip mechanism 24 and the hammer 26 of the circuit breaker 10 is shown in an open or tripped state 46 where $\theta_3$ is greater than 180°. In the event of a fault or large current spike, the first trip mechanism 24 activates. The hammer 26 extends away from the first trip mechanism 24 and actuates the linkage 50. The first and second contacts 16, 18 rapidly separate, tripping the circuit breaker 10. This arrangement is a very efficient system due to the spring force caused imparted on pivot arm 34, which results in the rapid separation of the contacts.

Figure 4:
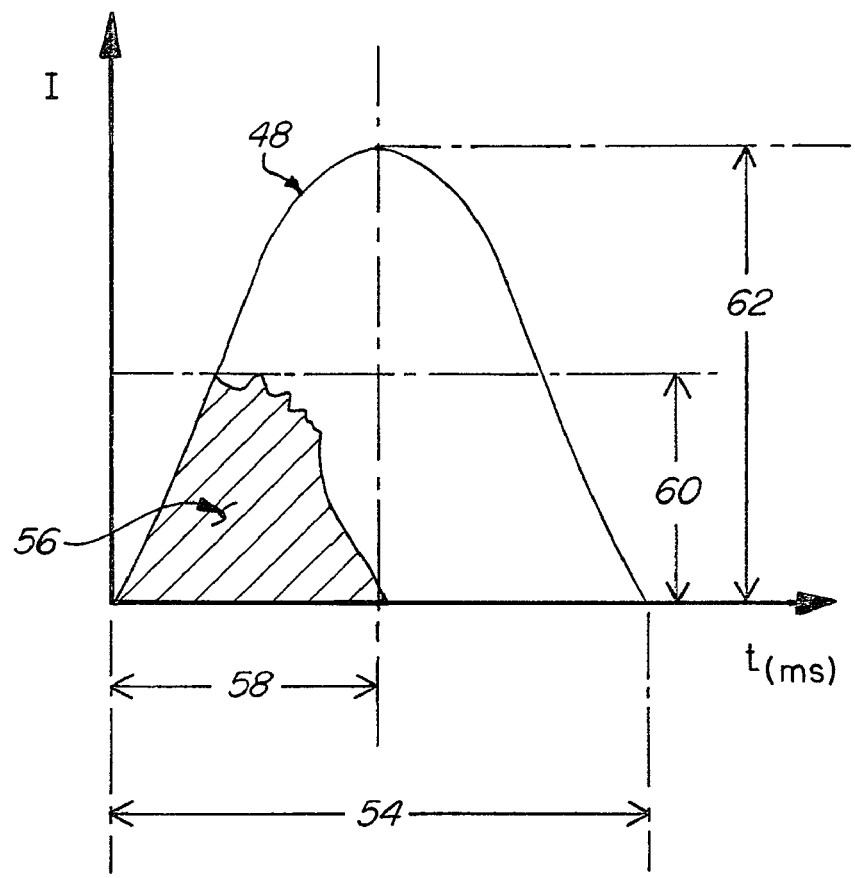
FIG. 4 is a graph of the current as a function of time as compared to conventional design without current limiting in the event of an overcurrent trip.

As shown in FIG. 4 (FIG. 4), a graph of current passing through the circuit breaker 10 as a function of time during an overcurrent trip for one embodiment of the present invention as compared to conventional design is shown. A first curve 48 depicts a current profile for conventional delayed current limiting breaker. If the current in the circuit breaker 10 is below a threshold 60, then the current will pass through and the circuit breaker will not trip. For example, the threshold 60 may be a load of about 600% of the maximum rated load of the circuit breaker 10, as described above. When the current rises above the threshold 60 the circuit breaker trips, but because of delay, the current continues to rise until after the angle of the sine wave hits zero when the delayed breaker trips. The time a conventional delayed current limiting breaker takes to trip 54 may be in the range of 8 to 10 milliseconds.

A second curve 56 depicts the current profile for a preferred embodiment of the present invention in the event of an overcurrent trip. As soon as the current reaches the threshold 60, the first trip mechanism 24 activates and the hammer 26 actuates the linkage 50 to open the breaker. Unlike conventional delayed designs, there is little to no delay between the large current spike and the opening of the first and second contacts 16, 18 due to the rapid of the first trip mechanism 24. As such, the current never reaches the peak current 62 illustrated in FIG. 4. The present invention causes the first and second contacts 16, 18 to separate rapidly, which in turn forces the current to zero in a time 58 that is significantly less than conventional designs (e.g., time 58 may be less than 5 milliseconds).

This device has the advantage in that the circuit breaker can immediately trip in the event of a high overcurrent fault condition or other large current spike which then forces the current to drop to zero in a rapid manner, while also having the advantages of a delayed trip mechanism for lower level over currents.

Thus, specific compositions of circuit breakers with current limiting and high speed fault capability have been disclosed. It should be apparent, however, to those skilled in the art that many more modifications besides those already described are possible without departing from the inventive concepts herein. The inventive subject matter, therefore, is not to be restricted except in the spirit of the disclosure. Any such changes and modifications that can be made to the illustrated embodiment without departing from the spirit of the invention are intended to be covered hereby. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A circuit breaker comprising:
 a first contact and a second contact;
 said first or said second contact movable with respect to the other contact such that contacts may be placed in a first state in where the contacts are closed relative to each other, and a second state where the contacts are open relative to each other;
 an overcurrent mechanism for measuring a current passing through the contacts, said overcurrent mechanism including:
  a first trip mechanism for causing the contacts to open relative to each other, said first trip mechanism opening of the contacts when the current exceeds a first threshold level;
  a second trip mechanism for causing the contacts to open relative to each other, said second trip mechanism having a setting that introduces a time delay in the opening of the contacts when the current exceeds a second threshold level;
  a linkage having first and second pivot arms connected to each other via a pivot, and having a third pivot arm connected at one end to said second contact and at another end to said second pivot arm, said linkage acted on by said first trip mechanism or said second trip mechanism such that actuation of said first trip mechanism or said second trip mechanism causes movement of said linkage, which causes one of said first or second contacts to move relative to the other contact;
 a handle connected to said linkage such that manual actuation of said handle causes said contacts to move between open and closed positions, wherein said first pivot arm is connected at one end to said handle and is connected at another end to said second pivot arm;
 wherein when the contacts are in a closed position, an angle $\theta_1$ is formed between the first pivot arm and the second pivot arm, where the angle $\theta_1$ is less than 180 degrees, the first and second pivot arms held under a mechanical advantage; and
 wherein when said linkage is acted on by said first trip mechanism or said second trip mechanism the mechanical advantage is released and one of the contacts are moved to the open position such that the angle $\theta_1$ is changed to an angle $\theta_3$, wherein the angle $\theta_3$ is greater than 180 degrees.

2. The circuit breaker of claim 1 wherein said second pivot arm comprises a first latch and a second latch.

3. The circuit breaker of claim 1 wherein said first trip mechanism comprises a first solenoid, and said second trip mechanism comprises a second solenoid.

4. The circuit breaker of claim 3 wherein said first solenoid comprises an overcurrent sensor.

5. The circuit breaker of claim 4 wherein said first solenoid is selected from the group consisting of: a hydraulic magnetic solenoid or a thermal magnetic solenoid.

6. The circuit breaker of claim 5 wherein said second solenoid comprises an overcurrent sensor.

7. The circuit breaker of claim 6 wherein said second solenoid is selected from the group consisting of: a hydraulic magnetic solenoid or a thermal magnetic solenoid.

8. The circuit breaker of claim 7 wherein the first threshold level is at least 600% of a maximum rated current of the circuit breaker.

9. The circuit breaker of claim 7 wherein the second threshold level is at least 125% of a maximum rated current of the circuit breaker.

10. The circuit breaker of claim 1 wherein said circuit breaker is detachably connectable to an electrical panel board.

11. A circuit breaker comprising:
a first and a second contact, said second contact movable with respect to the first contact such that contacts may be placed in a first state in where the contacts are closed relative to each other, and a second state where the contacts are open relative to each other;
a first trip mechanism measuring a current passing through the contacts and causing the second contact to open relative to the first contact when a current measured current exceeds a first threshold level;
a second trip mechanism measuring a current passing through the contacts and causing the second contact to open relative to the first contact when a current measured current exceeds a second threshold level said second trip mechanism having a setting that introduces a time delay such that the second contact does not move until after the time delay expires;
a linkage having a first pivot arm connected to a second pivot arm, and said second pivot arm connected to a third pivot arm, said third pivot arm connected to said second contact, said linkage acted on by said first trip mechanism or said second trip mechanism such that actuation of said first trip mechanism or said second trip mechanism causes movement of said linkage, which causes said second contact to move relative to said first contact;
a handle connected to said first pivot arm such that manual actuation of said handle causes said second contact to move between open and closed positions;
wherein when the contacts are in a closed position, an angle $\theta_1$ is formed between the first pivot arm and the second pivot arm, where the angle $\theta_1$ is less than 180 degrees, the first and second pivot arms held under a mechanical advantage; and
wherein when said linkage is acted on by said first trip mechanism or said second trip mechanism the mechanical advantage is released and the second contact is moved to the open position such that the angle $\theta_1$ is changed to an angle $\theta_3$, wherein the angle $\theta_3$ is greater than 180 degrees.

12. The circuit breaker of claim 11 wherein said first trip mechanism comprises a first solenoid, and said second trip mechanism comprises a second solenoid.

13. The circuit breaker of claim 11 wherein said second pivot arm comprises a first latch and a second latch.

14. A circuit breaker comprising:
a first and a second contact, said second contact movable with respect to the first contact such that contacts may be placed in a first state in where the contacts are closed relative to each other, and a second state where the contacts are open relative to each other;
a trip mechanism measuring a current passing through the contacts and causing the second contact to open relative to the first contact when a current measured current exceeds a threshold level;
a linkage coupled to said second contact, said linkage including a first pivot arm connected to a second pivot arm, and a third pivot arm connected between said second pivot arm and said second contact, said linkage acted on by said trip mechanism such that actuation of said trip mechanism causes movement of said linkage, which causes said contacts to move from the first state to the second state;
wherein when the contacts are in a closed position, an angle $\theta_1$ is formed between the first pivot arm and the second pivot arm, where the angle $\theta_1$ is less than 180 degrees, the first and second pivot arms held under a mechanical advantage; and
wherein when said linkage is acted on by said trip mechanism the mechanical advantage is released and the second contact is moved to the open position such that the angle $\theta_1$ is changed to an angle $\theta_3$, wherein the angle $\theta_3$ is greater than 180 degrees.

15. The circuit breaker of claim 14 wherein said trip mechanism is a first trip mechanism and is a first solenoid, said circuit breaker further comprising a second trip mechanism where said second trip mechanism is a second solenoid where activation of said second solenoid causes said contacts to move from the first state to the second state.

16. The circuit breaker of claim 14 further comprising a handle coupled to said linkage, wherein manual actuation of said handle causes said second contact to move between open and closed positions.

17. The circuit breaker of claim 14 wherein said second pivot arm comprises a first latch and a second latch.

* * * * *